(12) United States Patent
Kim

(10) Patent No.: US 7,764,474 B2
(45) Date of Patent: Jul. 27, 2010

(54) EARTH LEAKAGE CIRCUIT BREAKER

(75) Inventor: Young Jun Kim, Goyang-si (KR)

(73) Assignee: Kapjin Co., Ltd., Anyang-Si, Gyeonggi-Do (KR)

( * ) Notice: Subject to any disclaimer, the term of this patent is extended or adjusted under 35 U.S.C. 154(b) by 373 days.

(21) Appl. No.: 11/916,204

(22) PCT Filed: May 26, 2006

(86) PCT No.: PCT/KR2006/002013

§ 371 (c)(1),
(2), (4) Date: Nov. 30, 2007

(87) PCT Pub. No.: WO2006/129935

PCT Pub. Date: Dec. 7, 2006

(65) Prior Publication Data

US 2009/0316312 A1     Dec. 24, 2009

(30) Foreign Application Priority Data

Jun. 2, 2005     (KR) ............... 10-2005-0047351

(51) Int. Cl.
*H02H 3/00* (2006.01)
*H02H 9/08* (2006.01)

(52) U.S. Cl. .................................................. 361/42

(58) Field of Classification Search ............... 361/42
See application file for complete search history.

(56) References Cited

U.S. PATENT DOCUMENTS

| | | | |
|---|---|---|---|
| 4,233,640 A | 11/1980 | Klein et al. | |
| 6,128,169 A * | 10/2000 | Neiger et al. | 361/42 |
| 6,407,893 B1 * | 6/2002 | Neiger et al. | 361/42 |
| 2001/0036048 A1 | 11/2001 | Goto et al. | |

FOREIGN PATENT DOCUMENTS

| | | |
|---|---|---|
| JP | 2000-312434 | 11/2000 |
| JP | 2004-096818 | 3/2004 |
| JP | 2004-220859 | 8/2004 |

* cited by examiner

*Primary Examiner*—Ronald W Leja
(74) *Attorney, Agent, or Firm*—IPLA P.A.; James E. Bame

(57) ABSTRACT

The present invention relates to an Earth Leakage Circuit Breaker (ELCB) used as an electric switch for an electrical circuit which employs a double breakage method of determining whether leakage occurs based on total leakage voltage of a total leakage current detected by a zero-phase current transformer 20 and automatically cutting off the supply of power from a power supply, and determining whether leakage occurs based on the net leakage voltage of a net leakage current synchronously detected by a synchronous detector 90 and automatically cutting off the supply of power from the power supply, so that there are advantages in that the rate of incidence of malfunction of the ELCB is reduced and the leakage breaking function of the ELCB is effectively improved, thereby considerably improving safety.

4 Claims, 4 Drawing Sheets

[Fig. 1]
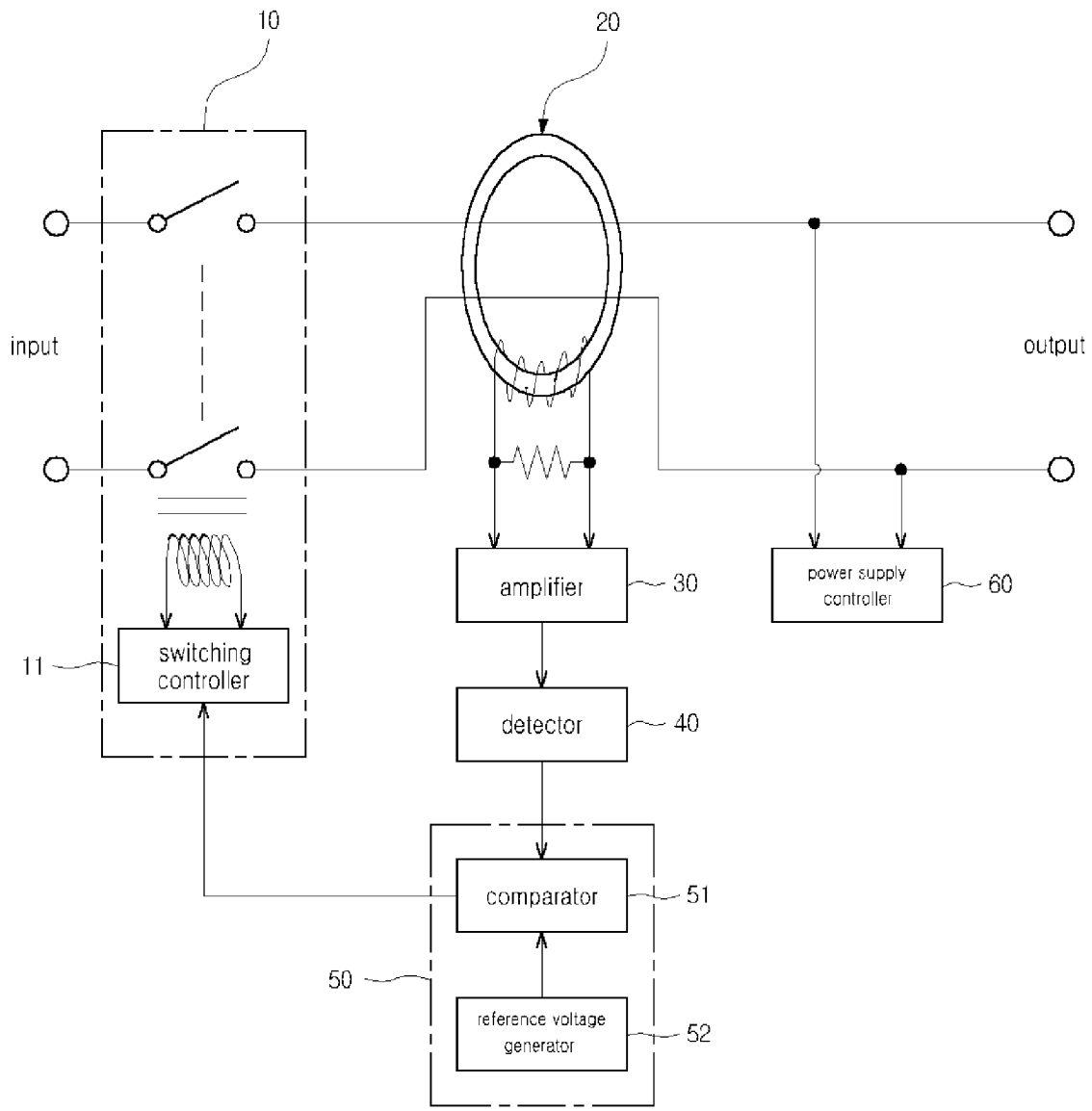

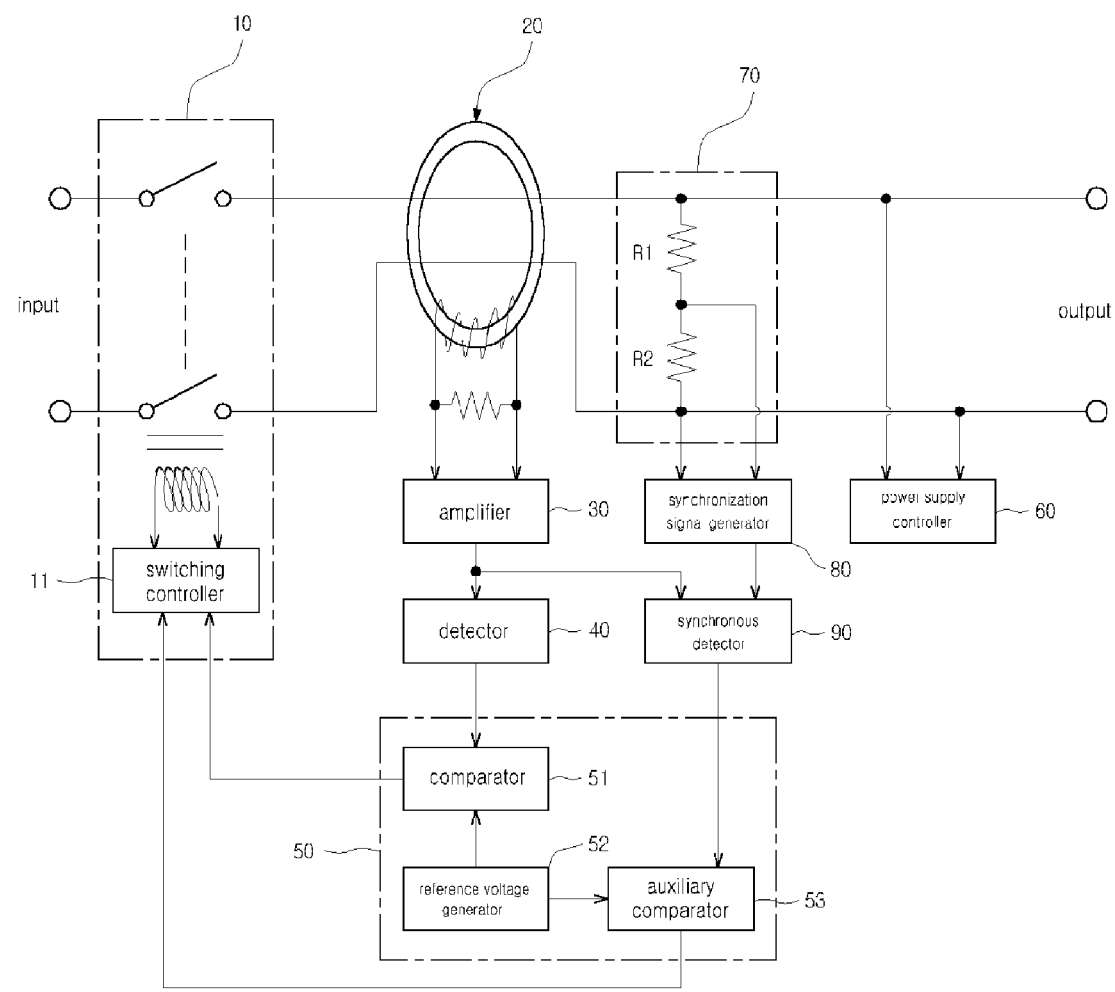
[Fig. 2]

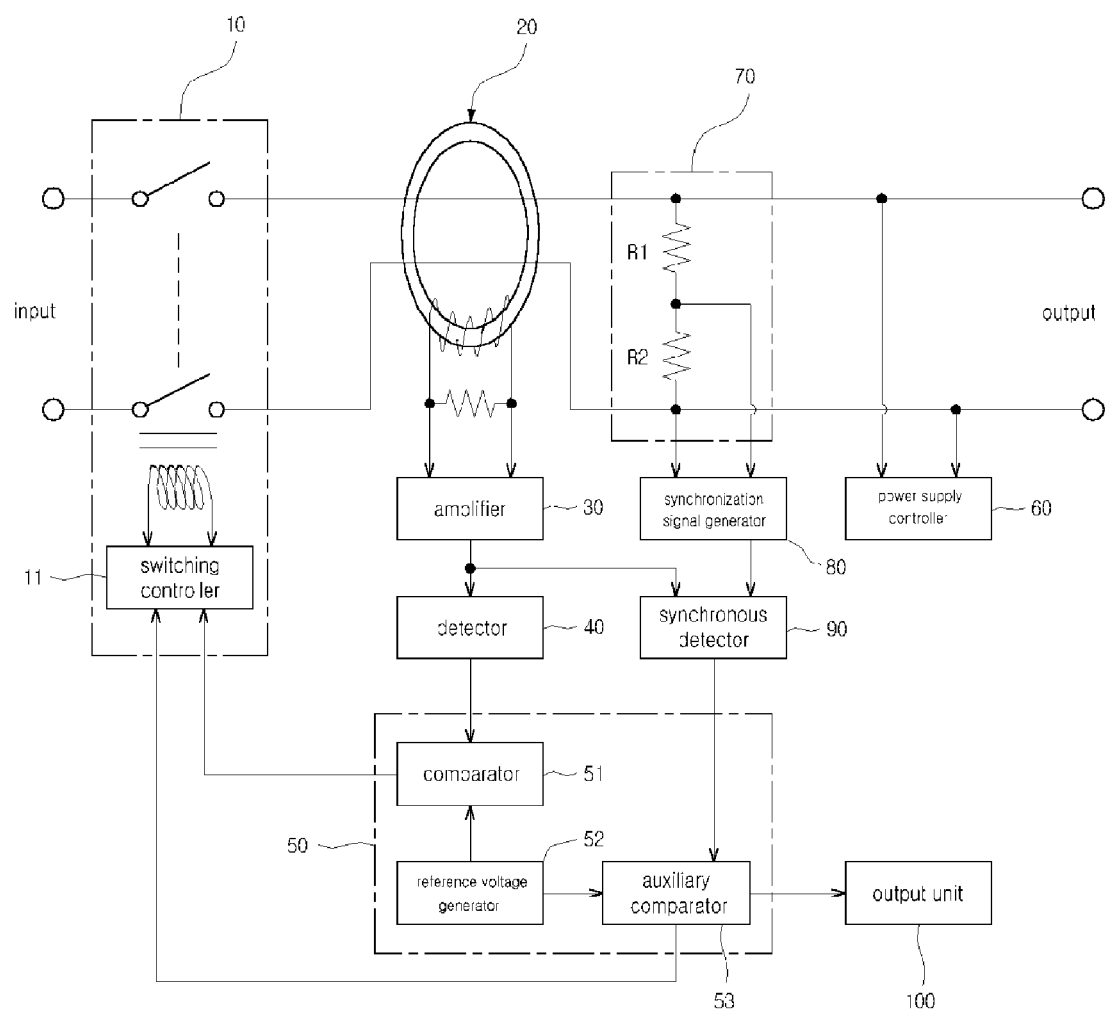
[Fig. 3]

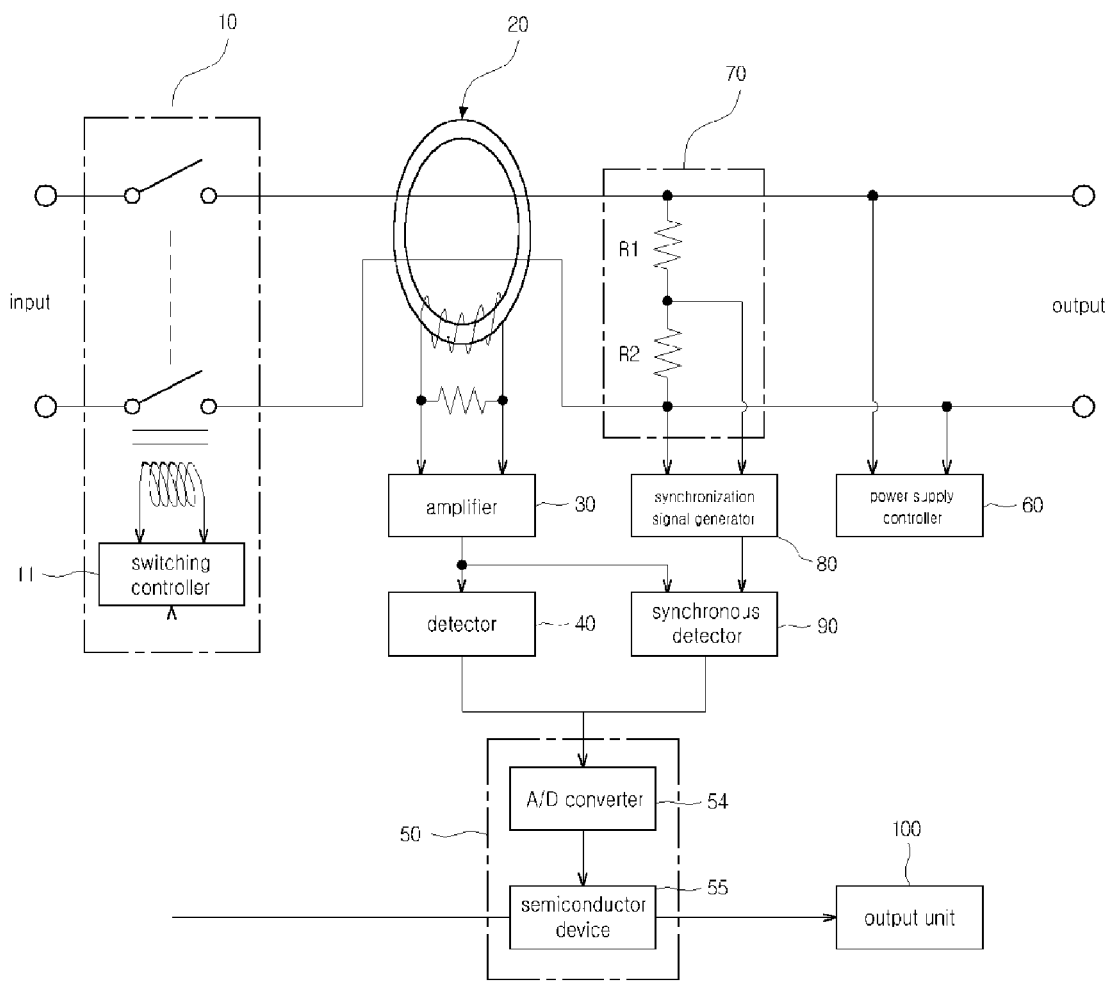
[Fig. 4]

EARTH LEAKAGE CIRCUIT BREAKER

TECHNICAL FIELD

The present invention relates, in general, to an earth leakage circuit breaker used as an electric switch for an electrical circuit and, more particularly, to an earth leakage circuit breaker, the safety of which is further improved.

BACKGROUND ART

As well known, circuit breakers used as electric switches for electrical circuits are classified into Earth Leakage Circuit Breakers (ELCBs) used to prevent electric shocks from passing through human bodies and fires from occurring due to leakage, and No Fuse Breakers (NFBs) used to cut off an excessive amount of current due to a short circuit and the overflow of current caused by excessive usage of a load (a device or a machine).

Of the two, the ELCBs are current-operated breakers employing a method of detecting current and cutting off a circuit when current leaking to earth is generated due to leakage at a load. The ELCBs use a Zero-phase Current Transformer (ZCT) as a detection device. An example of the ELCBs is illustrated in FIG. 1.

Referring to FIG. 1, a conventional ELCB includes a switching unit 10 for automatically cutting off the supply of power from an electrical circuit under the operation control of a control unit 50; a zero-phase current transformer 20 for detecting the leakage current of the electrical circuit; an amplifier for amplifying voltage of the leakage current received from the zero-phase current transformer 20; a detector 40 for rectifying and smoothing the leakage current received from the amplifier 30 and generating leakage voltage; the control unit 50 including a reference voltage generator 52 for generating reference voltage for determination of leakage and a comparator 51 for determining whether leakage occurs by comparing the leakage voltage from the detector 40 with the reference voltage from the reference voltage generator 52 and automatically controlling the operation of the switching unit 10; and a power supply controller 60 for controlling the supply of power to the respective components from the electrical circuit.

The operation of the ELCB is schematically described below.

When the switching unit 10 is turned on, current flows from a power source to a load. In this case, when the electrical circuit is in a normal state, magnetic fluxes generated in the zero-phase current transformer 20 are offset with each other, so that leakage current due to electromagnetic induction is not detected. In contrast, when the electrical circuit is in an abnormal state, a difference between magnetic fluxes, corresponding to leakage or over-load, occurs, so that leakage current corresponding to the difference between magnetic fluxes due to electromagnetic induction is output from the zero-phase current transformer 20.

If the electrical circuit is in an abnormal state, the leakage current detected by the zero-phase current transformer 20 is amplified by the amplifier 30 and is provided to the detector 40.

The detector 40 rectifies and smoothes the leakage current received from the amplifier 30, thereby generating leakage voltage. The leakage current received from the amplifier 30 is alternating current, and the leakage voltage obtained through the rectification and the smoothing is average voltage of the leakage current, which is direct current.

The reference voltage generator 52 generates a reference voltage in order to determine whether leakage occurs. The reference voltage is direct current voltage, and, if required, may vary.

In the above-described state, the comparator 51 compares the leakage voltage from the detector 40 with the reference voltage from the reference voltage generator 52, determines whether leakage occurs, and automatically controls the operation of the switching unit 10. The switching unit 10 is controlled by the comparator 51 and automatically cuts off the supply of power from an electrical circuit.

However, such a conventional ELCB employs a method of comparing the leakage voltage of total leakage current detected by the zero-phase current transformer 20 with the reference voltage and determining whether leakage from an electrical circuit occurs, so that problems occur in that the malfunction of the ELCB occurs and the improvement of safety is restricted.

In greater detail, the leakage current detected by the zero-phase current transformer 20 is leakage current in which the leakage current due to leakage resistance and the leakage current due to a condenser, which constitutes a load, are added to each other without distinction. For reference, the condenser is installed on the ground line of a load in order to prevent noise such as Electro Magnetic Interference (EMI) or Electro Magnetic Compatibility (EMC). The leakage current due to the condenser does not much affect the occurrence of an electric shock on a human body or the occurrence of a fire due to leakage.

As a result, when the reference voltage of the reference voltage generator is reduced without taking the leakage current due to the condenser into account, the ELCE reacts sensitively, thereby ensuring safety. However, there is a problem in that the ELCB frequently operates even when leakage does not occur. In contrast, when the reference voltage of the reference voltage generator is appropriately increased with the leakage current due to the condenser sufficiently taken into account, the malfunction of the ELCB due to the leakage current of the condenser is reduced. However, the ELCB reacts insensitively, so that a problem occurs in that safety is not ensured.

Conventionally, in the determination of reference voltage, the reference voltage is determined with the leakage current due to a condenser taken into account so as to ensure safety against leakage, while preventing an ELCB from unnecessarily operating.

Therefore, in the conventional art, there are limitations in the prevention of the malfunction of an ELCB and the improvement of safety.

DISCLOSURE OF INVENTION

Technical Problem

Accordingly, the present invention has been made keeping in mind the above problems occurring in the prior art, and an object of the present invention is to provide an ELCB that has improved safety and the reduced incidence of malfunction.

Technical Solution

In order to accomplish the above object, the present invention provides an Earth Leakage Circuit Breaker (ELCB) having a switching unit for automatically cutting off supply of power from an electrical circuit under the control of a control unit; a zero-phase current transformer for detecting leakage current of an electrical circuit; an amplifier for amplifying voltage of the leakage current received from the zero-phase current transformer; a detector 40 for rectifying and smoothing the leakage current received from the amplifier and generating leakage voltage; the control unit for determining whether leakage occurs by comparing the leakage voltage from the detector with reference voltage and automatically controlling operation of the switching unit; and a power supply controller for controlling supply of power from the electrical circuit to the respective elements, including a voltage divider for dividing and detecting voltage of the electrical circuit; a synchronization signal generator for converting the detected voltage from the voltage divider into a square wave synchronization signal; and a synchronous detector for synchronously detecting, rectifying and smoothing the leakage current received from the amplifier in synchronization with the synchronization signal from the synchronization signal generator and then generating net leakage voltage; wherein the control unit determines whether leakage occurs by comparing the leakage voltage from the detector with the reference voltage and automatically controls the operation of the switching unit, and determines whether leakage occurs by comparing the net leakage voltage from the synchronous detector with net reference voltage and automatically controls the operation of the switching unit.

Advantageous Effects

According to the above-described present invention, a double breakage method of determining whether. leakage occurs based on the total leakage voltage of total leakage current detected by a zero-phase current transformer 20 and automatically cutting off the supply of power from a power supply, and determining whether leakage occurs based on the net leakage voltage of net leakage current synchronously detected by a synchronous detector 90 and automatically cutting off the supply of power from the power supply is employed, so that there are advantages in that the rate of incidence of malfunction of the ELCB is reduced and the leakage breaking function of the ELCB is effectively improved, thereby considerably improving safety.

BRIEF DESCRIPTION OF THE DRAWINGS

FIG. 1 is a diagram illustrating a conventional ELCB;

FIG. 2 is a diagram illustrating an ELCB according to a first embodiment of the present invention;

FIG. 3 is a diagram illustrating an application of the ELCB illustrated in FIG. 2; and FIG. 4 is a diagram illustrating an ELCB according to a second embodiment of the present invention.

DESCRIPTION OF REFERENCE CHARACTERS OF PRINCIPAL ELEMENTS

10; switching unit 11; switching controller
20; zero-phase current transformer
30; amplifier 40; detector
50; control unit 51; comparator
52; reference voltage generator
53; auxiliary comparator 54; A/D converter
55; semiconductor device 60; power supply controller
70; voltage divider 80; synchronization signal generator
90; synchronous detector 100; output unit

MODE FOR THE INVENTION

The present invention is described in detail with reference to the accompanying exemplary drawings below.

FIGS. 2 to 4 are drawings illustrating the present invention, in which the same reference numerals are used to designate the same components as FIG. 1, which illustrates the prior art, a description of which is omitted.

Referring to FIG. 2, an ELCB according to the present invention includes a switching unit 10 for automatically cutting off the supply of power from an electrical circuit under the operation control of a control unit 50; a zero-phase current transformer 20 for detecting the leakage current of an electrical circuit; an amplifier for amplifying voltage of the leakage current received from the zero-phase current transformer 20; a detector 40 for rectifying and smoothing the leakage current received from the amplifier 30 and generating leakage voltage; the control unit 50 for determining whether leakage occurs by comparing the leakage voltage from the detector 40 with the reference voltage and automatically controlling the operation of the switching unit 10, and determining whether leakage occurs by comparing net leakage voltage from a synchronous detector 90 with net reference voltage and automatically controlling the operation of the switching unit 10; a power supply controller 60 for controlling the supply of power to the respective components from the electrical circuit; a voltage divider for dividing and detecting the voltage of the electrical circuit; a synchronization signal generator 80 for converting detected voltage from the voltage divider 70 into a square wave synchronization signal; and a synchronous detector 90 for synchronously detecting, rectifying and smoothing the leakage current received from the amplifier in synchronization with the synchronization signal from the synchronization signal generator 80 and then generating the net leakage voltage.

In the case of the embodiment illustrated in FIG. 2, the control unit 50 includes a reference voltage generator 52 for generating the reference voltage and the net leakage voltage for determination of leakage, a comparator 51 for determining whether leakage occurs by comparing the leakage voltage from the detector 40 with the reference voltage from the reference voltage generator 52 and automatically controlling the operation of the switching unit 10, and an auxiliary comparator 53 for determining whether leakage occurs by comparing the net leakage voltage from the synchronous detector 90 and the net reference voltage from the reference voltage generator 52 and automatically controlling the operation of the switching unit 10.

The operation of the ELCB according to the present invention is described with reference to FIG. 2 below.

When the switching unit 10 is turned on, current flows from a power source to a load.

In this case, the leakage current detected by the zero-phase current transformer 20 is amplified by the amplifier 30 and is then provided to the detector 40. The detector 40 rectifies and smoothes the leakage current received from the amplifier 30 and then generates leakage voltage. The comparator 51 determines whether leakage occurs by comparing the leakage voltage from the detector 40 with the reference voltage from the reference voltage generator 52, and automatically controls the operation of the switching unit 10. In this case, the leakage current detected by the zero-phase current transformer 20 is leakage current in which the leakage current due to leakage resistance and the leakage current due to the condenser, constituting the load, are added to each other without distinction. The detector 40 acquires the leakage current from the zero-phase current transformer 20 without any change and rectifies and smoothes it, so that the reference voltage from the reference voltage generator 52 is set to a relatively high value with the condenser taken into account.

Meanwhile, the synchronous detector 90 synchronously detects, rectifies and smoothes the leakage current received from the amplifier 30 in synchronization with the synchronization signal from the synchronization signal generator 80 and then generates net leakage voltage. The auxiliary comparator 53 determines whether leakage occurs by comparing the net leakage voltage from the synchronous detector 90 and the net reference voltage from the reference voltage generator 52 and automatically controls the operation of the switching unit 10. In this case, current, for the condenser, current leads voltage by 90 degrees, so that the net leakage voltage, from which the leakage current by the condenser has been eliminated, is generated when the leakage current received from the amplifier 30 is synchronously detected, rectified and smoothed in synchronization with the synchronization signal from the synchronization signal generator 80. As a result, the net reference voltage from the reference voltage generator 52 is set to a relatively low value with safety taken into account.

The ELCB according to the present invention employs a double breakage method of determining whether leakage occurs based on total leakage current, in which the leakage current detected by the zero-phase current transformer 20 and the leakage current due to the condenser are added to each other and automatically cutting off the supply of power from a power supply, and, at the same time, of determining whether leakage occurs based on the net leakage current, from which the leakage current due to the condenser has been eliminated, and cutting off the supply of power from the power supply, thereby decreasing the incidence of malfunction of the ELCB and increasing safety.

For example, even when the leakage voltage of the leakage current detected by the zero-phase current transformer 20 is lower than the reference voltage, the switching unit 10 is turned off and the supply of power from the power supply is cut off as long as the net leakage voltage of the net leakage current synchronously detected by the synchronous detector 90 is higher than the net reference voltage.

Meanwhile, as illustrated in FIG. 3, when an output unit 100, which is controlled by the control unit 50 and outputs the operational status of the ELCB to the outside, is additionally provided, there is an advantage in that a user can easily perceive the operational status of the ELCB.

As the output unit 100, a well-known audible signal generator, such as a buzzer or a speaker, or a well-known visible signal generator, such as a Light Emitting Device (LED) or a display, can be used. In this embodiment, an LED, which is controlled by the auxiliary comparator 53 and displays the level of the net leakage voltage, or a buzzer, which is controlled by the auxiliary comparator 53 and generates an alarm, is used as the output unit 100.

FIGS. 2 and 3 illustrate an analog-type ELCB, whereas FIG. 4 illustrates a digital-type ELCB.

In the ELCB of FIG. 4, the control unit 50 includes an Analog/Digital (A/D) converter 54 for the leakage voltage from the detector 40 and the net leakage voltage from the synchronous detector 90 into digital signals, and a semiconductor device 55 for determining whether leakage occurs by comparing the leakage voltage from the detector 40, received through the A/D converter 54, with pre-stored reference voltage, determining whether leakage occurs by comparing the net leakage voltage from the synchronous detector 90 received through the A/D converter 54 with pre-stored net reference voltage and automatically controlling the operation of the switching unit 10.

In this embodiment, the leakage voltage to be compared with the leakage voltage of the leakage current detected by the zero-phase current transformer 20 and the net reference voltage to be compared with the net leakage voltage of the net leakage current synchronously detected by the synchronous detector 90 are previously stored in the semiconductor device 55 as data.

In the digital-type ELCB illustrated in FIG. 4, the output unit 100 is additionally provided, thus a user can easily perceive the operational status of the ELCB through the output unit 100. For example, a display, such as an LCD, controlled by the semi-conductor device 55 is used as the output unit 100, so that the user can directly check the numerical value of either the leakage current or the leakage voltage, or either the net leakage current or the net leakage voltage through the output unit 100, through text.

The present invention is not limited to the above-described embodiments and can be modified departing from the scope disclosed in the accompanying claims.

The invention claimed is:

1. An Earth Leakage Circuit Breaker (ELCB) having a switching unit (10) for automatically cutting off supply of power from an electrical circuit under control of a control unit (50); a zero-phase current transformer (20) for detecting leakage current of an electrical circuit; an amplifier for amplifying voltage of the leakage current received from the zero-phase current transformer (20); a detector (40) for rectifying and smoothing the leakage current received from the amplifier (30) and generating leakage voltage; the control unit (50) for determining whether leakage occurs by comparing the leakage voltage from the detector (40) with reference voltage and automatically controlling operation of the switching unit (10); and a power supply controller (60) for controlling supply of power from the electrical circuit to the respective elements, comprising:

a voltage divider (70) for dividing and detecting voltage of the electrical circuit;
a synchronization signal generator (80) for converting the detected voltage from the voltage divider (70) into a square wave synchronization signal; and
a synchronous detector (90) for synchronously detecting, rectifying and smoothing the leakage current received from the amplifier in synchronization with the synchronization signal from the synchronization signal generator (80) and then generating net leakage voltage;
wherein the control unit (50) determines whether leakage occurs by comparing the leakage voltage from the detector (40) with the reference voltage and automatically controls the operation of the switching unit (10), and determines whether leakage occurs by comparing the net leakage voltage from the synchronous detector (90) with net reference voltage and automatically controls the operation of the switching unit (10).

2. The ELCB as set forth in claim 1, wherein the control unit (50) comprises a reference voltage generator (52) for generating the reference voltage and the net leakage voltage for determination of leakage, a comparator (51) for determining whether leakage occurs by comparing the leakage voltage from the detector (40) with the reference voltage from the reference voltage generator (52) and automatically controlling the operation of the switching unit (10), and an auxiliary comparator (53) for determining whether leakage occurs by comparing the net leakage voltage from the synchronous detector (90) and the net reference voltage from the reference voltage generator (52) and automatically controlling the operation of the switching unit (10).

3. The ELCB as set forth in claim 1, wherein the control unit (50) comprises an Analog/Digital (A/D) converter (54) for converting the leakage voltage from the detector (40) and the net leakage voltage from the synchronous detector (90) into digital signals, and a semiconductor device (55) for determining whether leakage occurs by comparing the leakage voltage from the detector (40), received through the A/D converter (54), with pre-stored reference voltage, determining whether leakage occurs by comparing the net leakage voltage from the synchronous detector 90 received through the A/D converter (54) with pre-stored net reference voltage and automatically controlling the operation of the switching unit (10).

4. The ELCB as set forth in any one of claims 1 to 3, further comprising an output unit (100) that is controlled by the control unit (50) and outputs operational status of the ELCB to an outside in order to allow a user to perceive the operational status of the ELCB.

* * * * *